(12) United States Patent  
Smemo et al.

(10) Patent No.: US 6,491,600 B1
(45) Date of Patent: Dec. 10, 2002

(54) TWO STAGE PLANETARY FINAL DEVICE

(75) Inventors: Alfred Sigmund Smemo, Dubuque, IA (US); Mariano Torres Galan, Madrid (ES)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/951,846

(22) Filed: Sep. 11, 2001

(51) Int. Cl.[7] ............................................... F16H 47/04
(52) U.S. Cl. ...................................................... 475/83
(58) Field of Search .............................. 475/83; 180/308

(56) References Cited

U.S. PATENT DOCUMENTS

| | | | |
|---|---|---|---|
| 4,177,870 A | 12/1979 | Henn | 180/243 |
| 4,183,419 A | 1/1980 | Henn et al. | 180/243 |
| 4,186,816 A | 2/1980 | Pfundstein | 180/243 |
| 4,546,844 A | 10/1985 | Stauffer | 180/243 |
| 4,986,377 A | 1/1991 | Moriarty | 180/6.5 |
| 5,391,123 A | * 2/1995 | Forster | 475/83 |
| 5,682,950 A | 11/1997 | Bjornstad | 166/99 |
| 5,928,099 A | * 7/1999 | Tsunemi | 475/83 |
| 6,112,826 A | 9/2000 | Ura et al. | 172/255 |

* cited by examiner

Primary Examiner—Dirk Wright

(57) ABSTRACT

A compact final drive assembly comprises a stationary housing and a rotatable housing. A bent axis hydraulic motor is coupled to the stationary housing. The bent axis hydraulic motor drives a planetary drive unit for driving the rotatable housing. A clutch/brake unit controls the planetary drive unit by braking the planet carrier. The clutch/brake unit is provided with a ring piston that is supplied pressurized hydraulic fluid from the motor inlet port of the bent axis hydraulic motor.

12 Claims, 3 Drawing Sheets

TWO STAGE PLANETARY FINAL DEVICE

FIELD OF THE INVENTION

The present invention is directed to a two stage planetary final drive that is operatively coupled to a hydraulic motor for driving a wheel of a work vehicle.

BACKGROUND OF THE INVENTION

Motor graders are large work vehicles. Typically they are provided with a main frame that is pivotally coupled to a forwardly extending frame about a vertical pivot axis. The main frame is provided with four driven wheels. Two longitudinally separated wheels are located on each side of the main frame. The main frame houses the internal combustion engine for powering the grader. The forwardly extending frame is supported on two front wheels. The forwardly extending frame is provided with a drawbar having a grader circle. A grader blade is mounted to the grader circle by a blade frame. The position of the grader blade relative to the grader frame is controlled by hydraulic cylinders. A saddle is mounted to the forwardly extending frame above the grader circle. The saddle is provided with hydraulic cylinders for manipulating the position of the grade circle relative to the forwardly extending frame.

Some graders are all wheel drive machines. Hydraulic wheel motors drive the front wheels. The motors selectively engage the front wheels by hydraulic clutches. The front wheels may be driven in an overdrive mode, where they are driven at a faster speed than the rear wheels; at an equal speed mode where they are driven at the same speed as the rear wheels; or in an underdrive mode, where they are driven slower than the rear wheels. The assignee of the present patent application manufactures an all wheel drive motor grader of the type discussed above. The clutch/brake in the front wheel final drive is triggered by twelve circumferentially arranged axially extending pistons. The arrangement of the final drive assembly causes the front wheel fastening assembly to be different from the rear wheel fastening assembly. This forces the operator to carry two different spare wheels and tire assemblies, one for the front and one for the rear, when operating in remote areas.

One manufacturer of all wheel drive motor graders uses mechanical overrunning clutches in place of hydraulically applied clutches.

SUMMARY

It is an object of the present invention to provide a compact final drive assembly having a wide range of speed outputs.

The final drive is contained within the circumference of a wheel that is the same size as the rear drive wheels, and uses the same fastening dimensions. In this way an operator need only carry one spare wheel and tire assembly that fits all wheels.

The final drive assembly comprises a stationary housing to which a rotatable housing is mounted. The rotatable housing in turn is coupled to the disc of the drive wheel. A bent axis two speed hydraulic motor is mounted to the stationary housing. The motor drives a first stage sun pinion which drives two stages of planetary gear trains, which in turn drive a second stage planet carrier mounted to a rotatable housing.

A second stage sun pinion is mounted coaxially to the first stage sun pinion. The second stage sun pinion freely floats radially on the first stage sun pinion. The second stage sun pinion is not driven by the first stage sun pinion. The external splines/teeth of the second stage sun pinion are coupled to and drive the internal splines of the first stage planet carrier, and drive the circumferentially arranged second stage planet gears. The second stage planet gears are freely rotatably mounted to the second stage planet carrier, which is coupled to the rotatable housing, and engage a clutch brake ring gear. The clutch/brake ring gear is operatively coupled to a plurality of clutch plates that extend inwardly and engage a clutch pack located on the stationary housing. A ring piston is used to compress the clutch pack coupling the clutch/brake ring gear to the stationary housing. The second stage planet gears coupled to the rotatable housing by the second stage planet carrier, drive the second stage planet carrier and thereby the rotatable housing and wheel.

The ring piston for applying the clutch is extended by pressurized hydraulic fluid directed through a hydraulic conduit formed in the stationary housing. The pressurized hydraulic fluid is received from the motor inlet. In the underdrive mode, the motor operates at a speed that is a preselected amount slower than the synchronous speed of the vehicle. This causes the front wheel to try to drive the motor, resulting in low motor inlet pressure, and the clutch/brake slipping. As the vehicle rear wheels lose traction and s lip to a greater degree than the preselected amount, the front wheels slow to the synchronous speed of the vehicle, motor inlet pressure rises, and the front wheel drive system provides traction without the need for any attention by the operator. Conversely, if the overdrive mode is selected, the front wheels attempt to pull the rear wheels, the motor inlet pressure is high, the clutch brake is locked, and the front wheels are continually driven by their motors. When the front wheel drive system is shut off, the motor i s stopped and the clutch/brake released thereby allowing the planetary gear system to idle. Effecting the clutch/brake function via the second stage ring gear permits the entire gear train to idle at low speed, with resultant low churning losses, when the front wheel drive system is shut off. When operating in the underdrive mode, the above mentioned clutch/brake slip occurs at low speed and low toque, with low slip power dissipation and churning losses.

DETAILED DESCRIPTION

Figure 1:
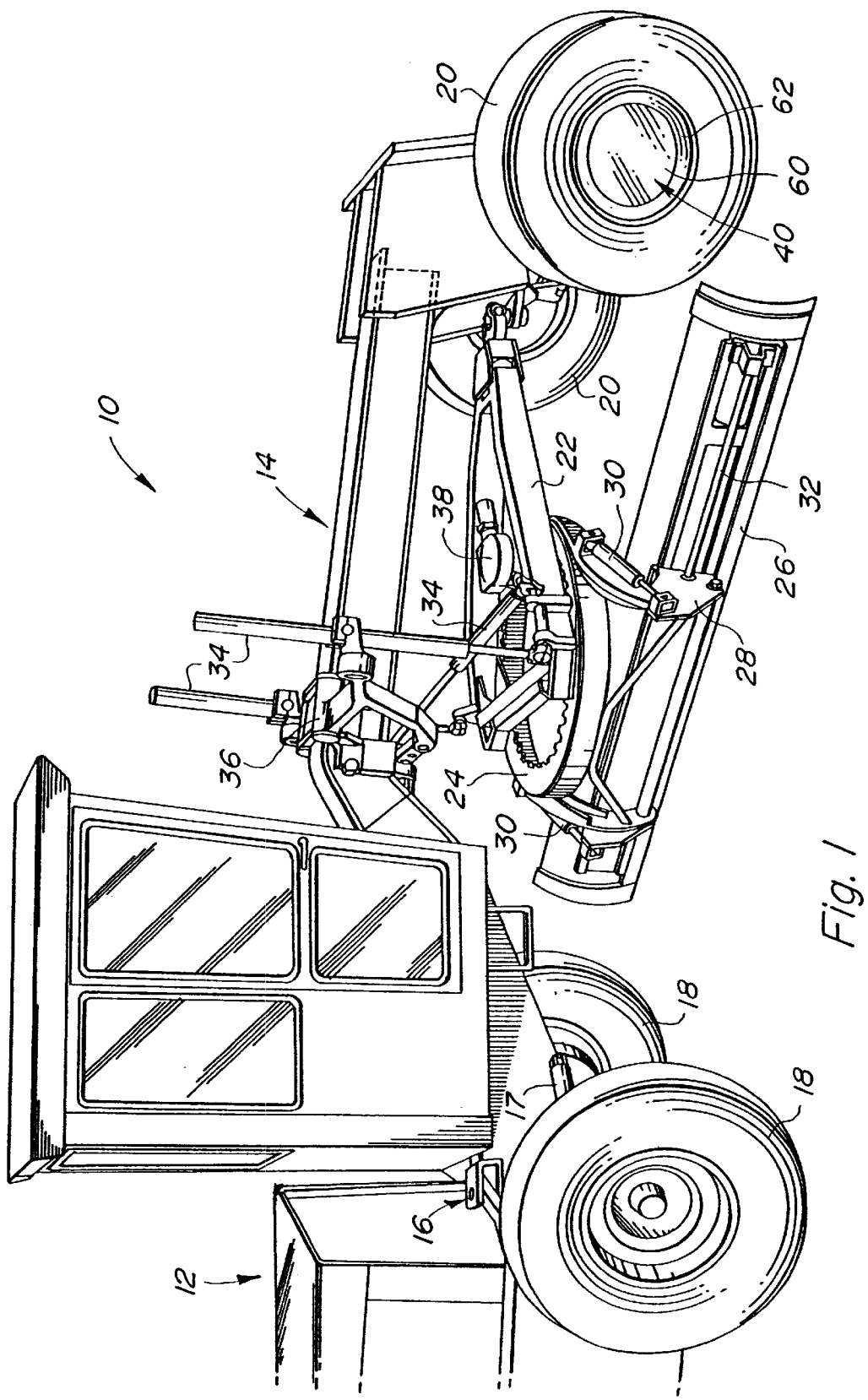
FIG. 1 is a perspective view of a motor grader.
Figure 2:
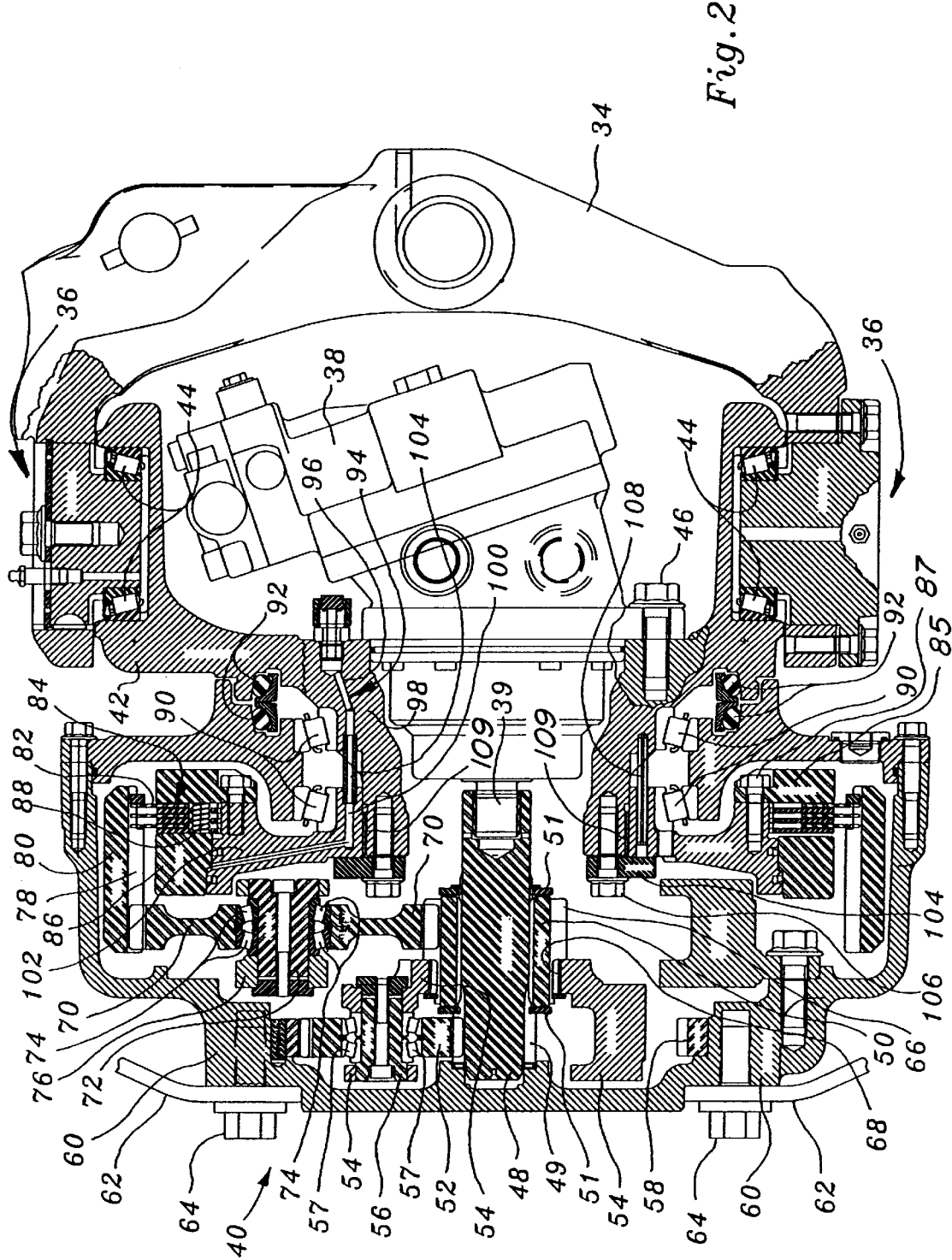
FIG. 2 is a cross sectional view of the front wheel final drive assembly.

Motor grader 10 is illustrated in FIG. 1. Grader 10 comprises a main frame 12 and a forwardly extending frame 14. A vertical pivot 16 pivotally couples the frames 12 and 14 to one another. Hydraulic cylinders 17, only one shown, articulate the position of the front frame 14 relative to the rear frame 12. The rear frame 12 is provided with four driven wheels 18 arranged in a right pair and a left pair, only the front driven wheels of each pair are shown. The front frame 14 is provided with two driven wheels 20. The front frame is also provided with a rearwardly extending drawbar 22 having a grader circle 24. A grader blade 26 is mounted to the grade circle 24 by blade frame 28. Hydraulic cylinders 30 control the pivotal position of the grader blade 26 relative to the grader frame 28. The lateral position of the grader blade 26 relative to the grader frame 28 is controlled by hydraulic cylinder 32, only the rod end shown. Hydraulic cylinders 34 that are mounted to saddle 36 control the position of the drawbar 22 relative to the front frame 14. The grader circle is rotatively positioned relative to the drawbar 22 by a grader circle motor 38.

The front wheels are driven by a two stage planetary final drive 40 that is operatively coupled to the front frame 14 by yoke 34. Vertically aligned lubricated kingpins 36 pivotally couples the final drive 40 to the yoke 34. The kingpins 36 define a vertical pivot axis. The kingpins 36 extend inwardly from the arms of the yoke 34 to engage stationary housing 42 of the final drive 40. The kingpins 36 are relatively large and use tapered roller bearings 44 to provide a robust structure to resist static and dynamic loads, while providing adequate mounting space for the hydro motor.

A bent axis two-speed hydro motor 38 is bolted to the stationary housing 42 by mounting bolts 46. The bent axis two-speed hydro motor 38 can be a Sauer Series 51 Bent Axis motor marketed by Sauer-Sundstrand. The drive axle 39 of the motor 38 is operatively coupled to sun pinion 48. Rotational movement of the drive axle 39 rotates the sun pinion 48. A second stage sun pinion 50 freely floats on sun pinion 48. The second stage sun pinion 50 is not provided with internal splines to engage the sun pinion 48; similarly the sun pinion 48 is not provided with external splines adjacent to the second stage sun pinion 50. The second stage sun pinion 50 is axially restrained between two washers 51.

The distal end of the sun pinion 48 is provided with external splines 49 for driving circumferentially arranged planet gears 52. The planet gears 52 are rotatably mounted to spindles 56 of planet carrier 54 by tapered bearings 57. The planet gears 52 also engage ring gear 58 that is affixed to rotatable housing 60. The rotatable housing in turn is bolted to wheel disc 62 by mounting bolts 64.

The second stage sun pinion 50 is provided with external splines 66 which engage both the internal splines 68 of the planet carrier 54 and the brake/clutch planet gears 70. The brake/clutch planet gears 70 are freely rotatably mounted on spindles 72 by tapered bearings 74. The spindles are mounted to an internal portion 76 of the rotatable housing 60. The clutch/brake planet gears 70 also engage the internal splines 78 of the clutch/brake ring gear 80. The internal splines 78 also engage clutch plates 82 that extend inwardly into contact with clutch pack 84. The clutch pack 84 is located between an annular plate 85 that is bolted to stationary housing 42 by mounting bolts 87 and a ring piston 86. The annular plate 85 forming part of the stationary housing 42. A plurality of circumferentially arranged axially extending coil springs 88 are used to bias the ring piston 86 into a retracted position.

The rotatable housing 60 is rotatably mounted to the stationary housing 42 by tapered bearings 90. Seals 92 are located between the rotatable housing 60 and the stationary housing 42.

Pressurized hydraulic fluid from the inlet port of the motor 38 is directed through hydraulic line 94 to the ring piston 86. The hydraulic line 94 comprises three sections: the first section 96 is a bore formed in the first part 98 of the stationary housing 42; the third section 100 is also a bore formed in the second part 102 of the stationary housing 60; and the second middle section 104 is a small tube extending between the first and third sections 96 and 100. The small tube is used to accommodate slight misalignment between the first and second parts 98 and 102 of the stationary housing 42. The second part is axially restrained by thrust washer 104. The thrust washer 104 is mounted to the first part 98 by mounting bolts 106. The second part 102 is rotatively aligned by a pin 108 extending between the parts 98 and 102. The second part 102 is rotatively restrained by splines 103.

Figure 3:
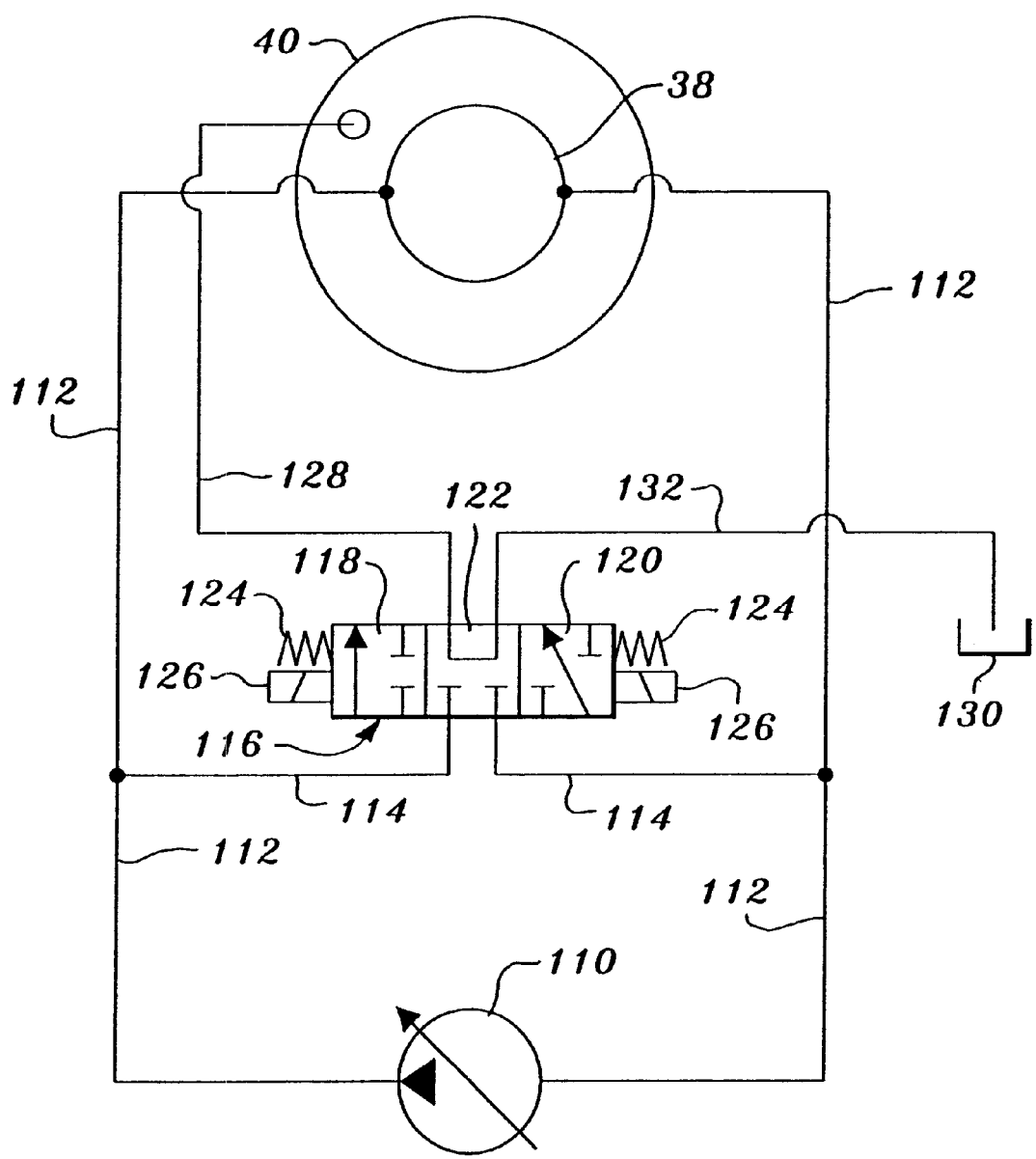
FIG. 3 is a hydraulic schematic.

The bent axis hydraulic motor 38 is supplied pressurized fluid from variable displacement hydraulic pump 110, as illustrated in FIG. 3. The positioning of the swash plate in the variable displacement pump is controlled by an electronic controller. The positioning of the swash plate not only controls the volume of fluid flow, but also the direction of flow. The electronic controller operates the pump 110 in accordance with the aggressiveness mode selected by the operator. Pressurized and exhausted hydraulic fluid is directed through supply/return lines 112 to motor 38. Hydraulic lines 114 extend between supply/return lines 112 and a three-position clutch valve 116. The three-position clutch valve 116 has a forward position 118, a reverse position 120 and a neutral position 122. The clutch valve 116 is balanced between springs 124. The position of the clutch valve 116 is controlled by electrically triggered solenoids 126. When the clutch valve 116 is in its forward or reverse position 118 or 120 pressured hydraulic fluid is directed through line 128 to hydraulic line 94 to extend ring piston 86. In its neutral position 122, line 128 is connected to sump 130 by exhaust line 132.

Inlet pressure at the motor 38 is directed through hydraulic lines 128 and 94 to the ring piston 86. As such, the inlet pressure at the motor 38 regulates the activation and deactivation of the clutch pack 84. A control system allows the operator to select various levels of "aggressiveness" —that is underdrive or overdrive. If a negative aggressiveness (underdrive) is selected, the motor 38 will be caused to rotate at a speed less than the synchronous speed with the rear driven wheels 18 The ground in contact with the wheel 20 drives the wheel at a speed faster than the motor 38 is driving the wheel. By driving the motor 38, the wheel 20 causes the motor inlet pressure to drop and the clutch pack 84 to slip. As the rear driven wheels 18 lose traction and slip in excess of the preselected speed differential, the motor inlet pressure increases locking the clutch pack 84 resulting in the motor 38 driving the wheel 20. In a positive aggressiveness (overdrive) mode, the front wheels 20 are told to drive at a faster speed than the rear wheels 18. In this mode the motor inlet pressure is high, locking the clutch pack 84, resulting in continuous drive.

The clutching function is performed by the clutch pack 84 locking the clutch/brake ring gear 80. Effecting the clutching action in this portion of the gear train not only permits the brake to slip at low torque and speed—hence low power dissipation, it also permits the entire gear train to idle at relatively low speeds with resulting low losses when the front wheel drive is shut off and the entire gear train is idling. This feature is of particular significance because motor graders are typically transported long distances at high speeds.

Having described the preferred embodiment, it will become apparent that various modifications can be made without departing from the scope of the invention as defined in the accompanying claims.

We claim:

1. A final drive assembly for a wheel, the final drive assembly comprising:

a stationary housing;

a bent axis hydraulic motor mounted to the housing;

a rotatable housing rotatably mounted to the stationary housing;

a sun pinion having external splines being driven by the bent axis motor;

circumferentially arranged planet gears engage the external splines of the sun pinion, the planet gears being rotatably mounted on a planet carrier having internal splines;

a ring gear mounted to the rotatable housing, the ring gear engaging the planet gears;

a secondary sun pinion having external splines freely floats on the sun pinion;

circumferentially arranged clutch/brake planet gears engage the external splines of the secondary sun pinion, the clutch brake planet gears being freely rotatably mounted to the rotatable housing;

a clutch/brake ring gear having internal splines engages the clutch/brake planet gears;

clutch plates extend between the clutch/brake ring gear and a clutch pack, the clutch pack being mounted to the stationary housing;

a hydraulic piston applies the clutch pack.

2. A final drive assembly as defined by claim 1 wherein the hydraulic piston is a ring piston.

3. A final drive assembly as defined by claim 2 wherein a hydraulic line extends between the bent axis hydraulic motor and the ring piston for applying motor inlet pressure to the ring piston.

4. A final drive assembly as defined by claim 3 wherein the stationary housing is pivotally coupled to a yoke by two kingpins.

5. A final drive assembly as defined by claim 4 wherein the rotatable housing is bolted to a wheel disc.

6. A final drive assembly for a wheel, the final drive assembly comprising:

a stationary housing;

a hydraulic motor mounted to the housing;

a rotatable housing rotatably mounted to the stationary housing;

a sun pinion having external splines being driven by the bent axis motor;

circumferentially arranged planet gears engage the external splines of the sun pinion, the planet gears being rotatably mounted on a planet carrier having internal splines;

a ring gear mounted to the rotatable housing, the ring gear engaging the planet gears;

a secondary sun pinion having external splines freely floats on the sun pinion;

circumferentially arranged clutch/brake planet gears engage the external splines of the secondary sun pinion, the clutch brake planet gears being freely rotatably mounted to the rotatable housing;

a clutch/brake ring gear having internal splines engages the clutch/brake planet gears;

clutch plates extend between the clutch/brake ring gear and a clutch pack, the clutch pack being mounted to the stationary housing;

a hydraulic ring piston applies the clutch pack.

7. A final drive assembly as defined by claim 6 wherein a hydraulic line extends between the hydraulic motor and the ring piston for applying motor inlet pressure to the ring piston.

8. A final drive assembly as defined by claim 7 wherein the stationary housing is pivotally coupled to a yoke by two kingpins.

9. A final drive assembly as defined by claim 8 wherein the rotatable housing is bolted to a wheel disc.

10. A final drive assembly for a wheel, the final drive assembly comprising:

a stationary housing;

a hydraulic motor mounted to the housing;

a rotatable housing rotatably mounted to the stationary housing;

a sun pinion having external splines being driven by the bent axis motor;

circumferentially arranged planet gears engage the external splines of the sun pinion, the planet gears being rotatably mounted on a planet carrier having internal splines;

a ring gear mounted to the rotatable housing, the ring gear engaging the planet gears;

a secondary sun pinion having external splines freely floats on the sun pinion;

circumferentially arranged clutch/brake planet gears engage the external splines of the secondary sun pinion, the clutch brake planet gears being freely rotatably mounted to the rotatable housing;

a clutch/brake ring gear having internal splines engages the clutch/brake planet gears;

clutch plates extend between the clutch/brake ring gear and a clutch pack, the clutch pack being mounted to the stationary housing;

a hydraulic piston applies the clutch pack;

a hydraulic line extends between the hydraulic motor and the hydraulic piston for applying motor inlet pressure to the hydraulic piston.

11. A final drive assembly as defined by claim 10 wherein the stationary housing is pivotally coupled to a yoke by two kingpins.

12. A final drive assembly as defined by claim 11 wherein the rotatable housing is bolted to a wheel disc.

* * * * *